No. 686,979. Patented Nov. 19, 1901.
W. R. KLOEB.
GAS BURNER.
(Application filed Feb. 18, 1901.)
(No Model.)

WITNESSES.
John Francis
James G. Carr.

William R. Kloeb. INVENTOR.
By Robert S. Carr. Atty.

THE NORRIS PETERS CO., PHOTO-LITHO., WASHINGTON, D. C.

UNITED STATES PATENT OFFICE.

WILLIAM R. KLOEB, OF HAMILTON, OHIO.

GAS-BURNER.

SPECIFICATION forming part of Letters Patent No. 686,979, dated November 19, 1901.

Application filed February 18, 1901. Serial No. 47,872. (No model.)

*To all whom it may concern:*

Be it known that I, WILLIAM R. KLOEB, a citizen of the United States, and a resident of Hamilton, Ohio, have invented certain new and useful Improvements in Gas-Burners, of which the following is a specification.

My invention relates to gas-burners of that class adapted to the use of either natural or artificial gas for heating purposes; and the objects of my improvement are to provide means for adjusting the mixing-chamber in relation to the discharge-openings, to provide a superheating retort which is adjustable in relation to the mixer, to provide a plural number of discharge-openings within an annular mixing-chamber, and to provide a removable basin to adapt the burner to the use of hydrocarbon. These objects are attained in the following-described manner, as illustrated in the accompanying drawings, in which—

Figures 1, 3:
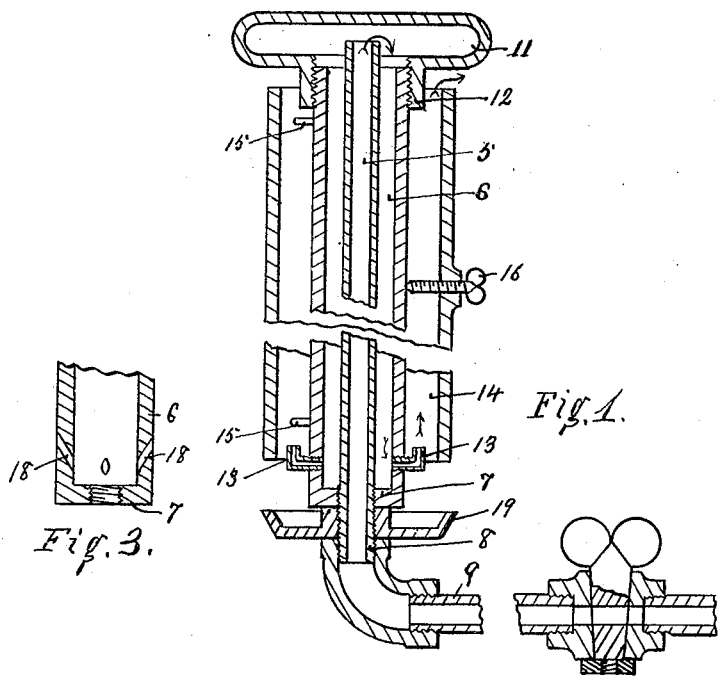
Figure 2:
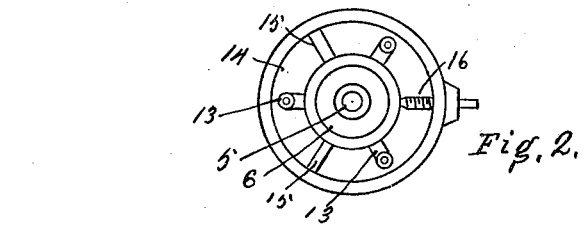

Figure 1 is a diametrical section of a burner embodying my improvement; Fig. 2, a plan of Fig. 1 with the retort removed, and Fig. 3 a modified form of constructing the discharge-openings.

In the drawings, 5 represents the delivery-pipe, secured within gas-chamber 6 and terminating at one end through the closed bottom 7 thereof in a threaded nipple 8, to which supply-pipe 9 is attached. The other end of the delivery-pipe opens within superheating-retort 11, which is adjustably secured over the open end of chamber 6 by means of threaded collar 12 being formed thereon. A series of elbow-nipples 13, secured in the side of the chamber at equal distances apart and near its bottom, form discharge-openings for the gas from the said chamber to the interior of mixer 14. Said mixer is cylindrical in form, with open ends, and encircles the chamber between the discharge-openings and the retort. Brackets 15 project from the interior and near the ends of the mixer in contact with the gas-chamber, whereon it is adjustably secured by means of screw 16, which is threaded through the middle portion of its side opposite the brackets. Said brackets and screw preferably are arranged to register with the middle of the respective spaces between the elbow-nipples, as shown in Fig. 2, where they offer the least obstruction to the passage of the gas toward the retort.

Perforations 18 may be made, preferably at an upward and outward angle, through the wall of the gas-chamber, as shown in Fig. 3, as a substitute for the elbow-nipples, with the advantage that they are more easily cleaned when they become clogged.

Basin 19 may be removably secured on nipple 8 against the bottom of the gas-chamber for generating sufficient gas to start the burner when a hydrocarbon is used.

In operation the gas is discharged by the delivery-pipe within the retort, where it is superheated and escapes through the gas-chamber and the discharge-openings therein to the interior of the mixing-chamber, where it commingles with atmospheric air and feeds the flame ignited at the annular opening or throat between the top of the mixer and the retort. The mixer may be adjusted more or less nearly over the discharge-openings to prevent the gas from igniting thereat, according to the respectively less or greater pressure of the gas, and the retort may be independently adjusted on the gas-chamber to regulate the size of the flame opening or throat thereunder in any adjusted position of the mixer.

The burner is supported under the stove-hole or within the chamber to be heated by means of the supply-pipe being secured thereto in the ordinary manner or otherwise, as may be required.

Having fully described my improvement, what I claim as my invention, and desire to secure by Letters Patent of the United States, is—

1. The combination with a cylindrical chamber, a retort adjustably secured on one end thereof and in communication therewith, a delivery-pipe extended axially through the chamber and discharging into the retort, and a plural number of discharge-openings formed in the chamber near its opposite end, of a cylindrical mixer formed with open ends encircling the chamber and longitudinally adjustable thereon between the said openings and the retort.

2. In a gas-burner, the combination with a chamber formed with a series of circumferential discharge-openings near one end, a retort secured on the other end thereof and communicating therewith, and a delivery-pipe extended axially through the chamber and discharging within the retort, of a cylindrical mixer formed with open ends secured on the chamber concentric thereto and between the said openings and the retort, and means to adjust the mixer longitudinally on the chamber.

3. In a gas-burner, the combination with a chamber formed with circumferential discharge-openings near one end, a discharge-pipe extending through said chamber, and a mixer formed with open ends encircling the chamber and adjustable longitudinally thereon in relation to the discharge-openings, of a retort adjustably secured on the other end of the chamber in relation to the mixer and communicating with the chamber and with the discharge-pipe.

WM. R. KLOEB.

Witnesses:
E. N. WHITE,
R. S. CARR.